United States Patent
Zhu

(10) Patent No.: US 10,078,234 B2
(45) Date of Patent: Sep. 18, 2018

(54) LIQUID CRYSTAL DISPLAY DEVICE

(71) Applicant: Shenzhen China Star Optoelectronics Technology Co., Ltd., Shenzhen (CN)

(72) Inventor: Jiang Zhu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 198 days.

(21) Appl. No.: 15/032,053

(22) PCT Filed: Apr. 8, 2016

(86) PCT No.: PCT/CN2016/078888
§ 371 (c)(1),
(2) Date: Apr. 25, 2016

(87) PCT Pub. No.: WO2017/152459
PCT Pub. Date: Sep. 14, 2017

(65) Prior Publication Data
US 2018/0113333 A1    Apr. 26, 2018

(30) Foreign Application Priority Data
Mar. 10, 2016 (CN) .......................... 2016 1 0137609

(51) Int. Cl.
*G02F 1/13*     (2006.01)
*G02F 1/133*    (2006.01)
*G02F 1/1345*   (2006.01)
*G02F 1/1362*   (2006.01)
*G09G 3/36*     (2006.01)

(52) U.S. Cl.
CPC ............ *G02F 1/1309* (2013.01); *G02F 1/133* (2013.01); *G02F 1/13452* (2013.01); *G02F 1/136286* (2013.01); *G09G 3/3611* (2013.01); *G02F 2201/503* (2013.01); *G02F 2202/22* (2013.01); *G09G 3/36* (2013.01);
(Continued)

(58) Field of Classification Search
CPC ............ G02F 1/1309; G02F 2201/503; G02F 2202/22; G09G 2330/12
See application file for complete search history.

(56) References Cited

U.S. PATENT DOCUMENTS

2008/0100763 A1* 5/2008 Park ................... G02F 1/13452
349/42
2014/0139792 A1* 5/2014 Zhu ....................... G02F 1/1345
349/106

FOREIGN PATENT DOCUMENTS

CN    101236315 A    8/2008

* cited by examiner

*Primary Examiner* — Kendrick Hsu
(74) *Attorney, Agent, or Firm* — Leong C. Lei

(57) ABSTRACT

The present invention provides a liquid crystal display device, in which a test point (TP) is constructed as a triangular structure with a grounding line (L3) arranged opposite to and facing an apex of the triangular structure, such that when static electricity is applied to the test point (TP), the static electricity is discharged, through tip discharging, from the apex of the test point (TP) to the grounding line (L3) to be released through the grounding line (L3) to the ground, whereby the capability of the liquid crystal display device resisting damage caused by static electricity is enhanced and compared to the prior art, no additional component is needed and the transmission of signals is not affected, thereby helping reduce cost and improve stability of the liquid crystal display panel.

14 Claims, 2 Drawing Sheets

(52) U.S. Cl.
CPC . *G09G 2300/0426* (2013.01); *G09G 2330/04* (2013.01); *G09G 2330/06* (2013.01); *G09G 2330/12* (2013.01)

LIQUID CRYSTAL DISPLAY DEVICE

BACKGROUND OF THE INVENTION

1. Field of the Invention

The present invention relates to the field of display technology, and in particular to a liquid crystal display device.

2. The Related Arts

Liquid crystal display (LCD) has a variety of advantages, such as thin device body, low power consumption, and being free of radiation and is thus used in various applications, such as liquid crystal televisions, mobile phones, personal digital assistants (PDAs), digital cameras, computer monitors, and notebook computer screens, placing it in a leading position of flat panel display devices.

Most of the liquid crystal displays that are currently available in the market are backlighting LCDs, which comprise a liquid crystal display panel and a backlight module. The working principle of the liquid crystal display panel is that liquid crystal molecules are filled between a thin-film transistor (TFT) array substrate and a color filter (CF) substrate and a driving voltage is applied to the two substrates to control rotation of the liquid crystal molecules to refract out light from the backlight module to generate an image.

Electro-static discharge (ESD) refers to the movement of electrical charges when objects carrying different electrostatic potentials are brought close to and made in direct contact with each other. ESD may generate an instantaneous voltage that is as large as thousands of volts, which often leads to ESD breakdown damage, making a liquid crystal display device unable to operate normally.

To prevent ESD breakdown damage, an ESD test is conducted in the course of manufacturing a liquid crystal display device. Reference being had to FIG. 1, FIG. 1 is a schematic view illustrating a drive structure and an electrostatic test point structure of a conventional liquid crystal display device, which generally comprise a display panel 100, a printed circuit board (PCB) 200, a chip-on-film (COF) 300 that connects the display panel 100 and the PCB 200, a drive integrated circuit (IC) 400 encapsulated in the COF 300, a signal line L100 arranged in the display panel 100, an output line L200 that connects the signal line L100 and the drive IC 400, and a test point TP arranged on the output line L200. During an ESD test, the ESD test is conducted by applying an ESD signal to the test point TP. The test point TP is generally of a shape of square or circle. To protect the static electricity from causing damage to the drive IC 400 and the signal line L100, in the prior art, a transient voltage suppressor (TVS) is often included in the PCB 200 for ESD protection. However, adding the TVS leads to an increase of component costs and also causes bright/dark lines appearing in the panel.

Point or tip discharging refers to electrical discharge occurring at a surface of an object having a relatively great surface curvature, such as a sharp part of an object or a tapering tip of a slender object, under a strong electric field. Generally, a design of an electronic product should avoid the occurrence of tip discharging.

SUMMARY OF THE INVENTION

An object of the present invention is to provide a liquid crystal display device, which improves the capability of the liquid crystal display device resisting electrostatic discharge damage without increasing the manufacturing cost and affecting signal transmission.

To achieve the above object, the present invention provides liquid crystal display device, which comprises: a display panel, a printed circuit board (PCB), a chip-on-film (COF) assembly connected between the display panel and the PCB, a drive integrated circuit (IC) packaged in the COF assembly, a signal line arranged in the display panel, an output line connected between the signal line and the drive IC, a test point arranged on the output line, and a grounding line arranged adjacent to and spaced from the output line;

wherein the test point has a shape of a triangle and the test point has an apex projecting beyond one side of the output line that is adjacent to the grounding line and facing the grounding line and not in contact engagement with the grounding line to induce a tip discharging effect for releasing static electricity from the test point to the grounding line.

The grounding line is electrically connected to a ground terminal of the PCB.

The signal line comprises a plurality of mutually parallel and spaced vertical data lines and a plurality of mutually parallel and spaced horizontal scan lines arranged in the display panel.

The COF assembly comprises a source COF sub-assembly for transmission of data signals and a gate COF sub-assembly for transmission of scan signals.

The data lines are electrically connected to output lines associated with the source COF sub-assembly and the scan lines are electrically connected to output lines associated with the gate COF sub-assembly.

The signal line, the output line, and the grounding line are metal lines.

The liquid crystal display device further comprises a system main board, wherein the system main board is electrically connected to the PCB.

The system main board is connected to the PCB by a connector arranged on the PCB.

The test point comprises an isosceles triangle and the test point has a bottom that is collinear and coincident with the output line such that the apex is made facing the grounding line.

The present invention also provides a liquid crystal display device, which comprises: a display panel, a printed circuit board (PCB), a chip-on-film (COF) assembly connected between the display panel and the PCB, a drive integrated circuit (IC) packaged in the COF assembly, a signal line arranged in the display panel, an output line connected between the signal line and the drive IC, a test point arranged on the output line, and a grounding line arranged adjacent to and spaced from the output line;

wherein the test point has a shape of a triangle and the test point has an apex projecting beyond one side of the output line that is adjacent to the grounding line and facing the grounding line and not in contact engagement with the grounding line to induce a tip discharging effect for releasing static electricity from the test point to the grounding line;

wherein the grounding line is electrically connected to a ground terminal of the PCB;

wherein the signal line comprises a plurality of mutually parallel and spaced vertical data lines and a plurality of mutually parallel and spaced horizontal scan lines arranged in the display panel;

wherein the COF assembly comprises a source COF sub-assembly for transmission of data signals and a gate COF sub-assembly for transmission of scan signals; and wherein the data lines are electrically connected to output lines associated with the source COF sub-assembly and the scan lines are electrically connected to output lines associated with the gate COF sub-assembly.

The efficacy of the present invention is that the present invention provides a liquid crystal display device, in which a test point is constructed as a triangular structure with a grounding line arranged opposite to and facing an apex of the triangular structure, such that when static electricity is applied to the test point, the static electricity is discharged, through tip discharging, from the apex of the test point to the grounding line to be released through the grounding line to the ground, whereby the capability of the liquid crystal display device resisting damage caused by static electricity is enhanced and compared to the prior art, no additional component is needed and the transmission of signals is not affected, thereby helping reduce cost and improve stability of the liquid crystal display panel.

BRIEF DESCRIPTION OF THE DRAWINGS

For better understanding of the features and technical contents of the present invention, reference will be made to the following detailed description of the present invention and the attached drawings. However, the drawings are provided for the purposes of reference and illustration and are not intended to impose limitations to the present invention. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
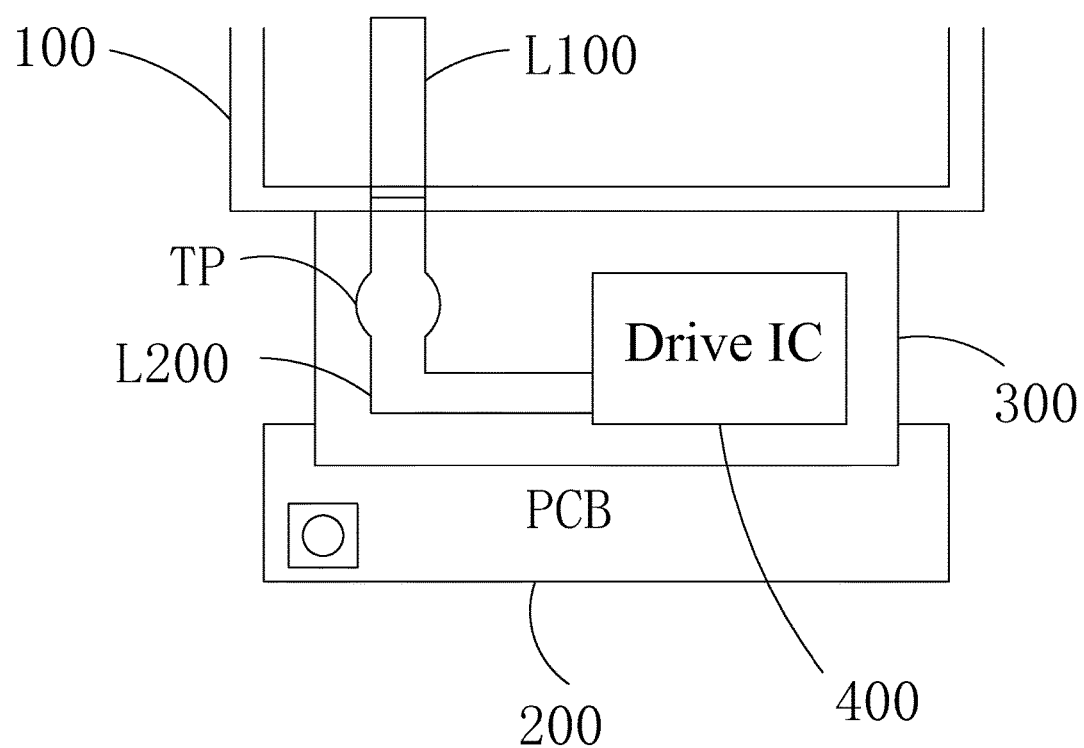
FIG. 1 is a schematic view illustrating a drive structure of a conventional liquid crystal display device and an electrostatic test point structure thereof.
Figure 2:
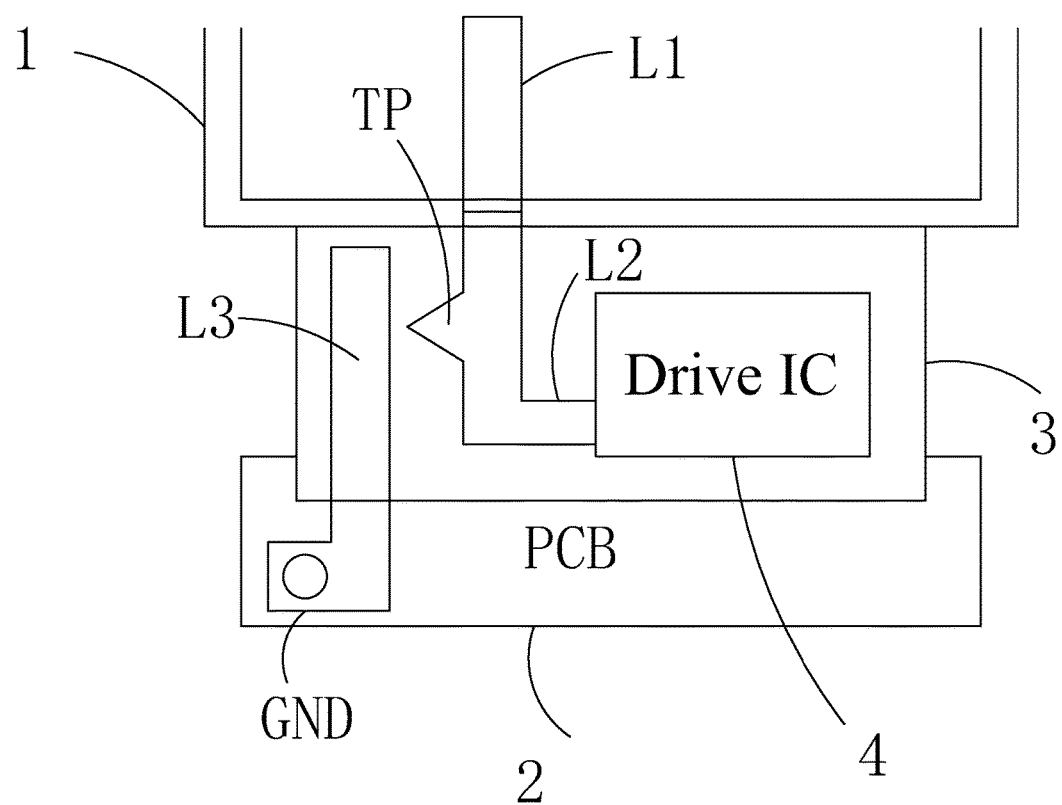
FIG. 2 is a schematic view illustrating a structure of a liquid crystal display device according to the present invention.

Referring to FIG. 2, the present invention provides a liquid crystal display device, which comprises: a display panel 1, a printed circuit board (PCB) 2, a chip-on-film (COF) assembly 3 that is connected between the display panel 1 and the PCB 2, a drive integrated circuit (IC) 4 packaged in the COF assembly 3, a signal line L1 arranged in the display panel 1, an output line L2 that is connected between the signal line L1 and the drive IC 4, a test point TP arranged on the output line L2, and a groundling line L3 that is arranged adjacent to and spaced from the output line L2.

The test point TP is of a triangular shape. The test point TP has an apex projecting beyond one side of the output line L2 that is adjacent to the grounding line L3 and facing the grounding line L3 and is not in contact engagement with the grounding line L3 in order to induce a tip discharging effect for discharging static electricity from the test point TP to the grounding line.

Preferably, the test point TP has a shape of an isosceles triangle and the triangle has a bottom that is collinear and coincident with the output line L2 such that the apex is made facing the grounding line L3.

It is noted here that the test point TP is uniquely designed as a triangle that has an apex (namely a sharp tip) so that when static electricity is applied to the test point TP, electrical charges accumulate at the apex of the test point TP, leading to a significant increase of charge density and strength of electric field induced thereby so as to break through air or gas neighbouring the apex of the test point TP and generate electrical discharging. The grounding line L3 that is opposite to and faces the apex of the test point TP receives and feeds the discharged electricity to the ground so as to protect the signal line L1, the output line L2, the COF assembly, and the drive IC from damage caused by ESD breakdown.

Specifically, the grounding line L3 is electrically connected to a ground terminal GND of the PCB 2 for transmitting the static electricity to the ground.

Specifically, the signal line L1 may comprise a plurality of mutually parallel and spaced vertical data lines and a plurality of mutually parallel and spaced scan lines arranged in the display panel 1. The COF assembly 3 comprises a source COF sub-assembly for transmission of data signals and a gate COF sub-assembly for transmission of scan signals. The data lines are electrically connected to the output lines L2 associated with the source COF sub-assembly and the scan lines are electrically connected to the output lines L2 associated with the gate COF sub-assembly such that data signals are transmitted through the source COF sub-assembly to the data lines and the scan signals are transmitted through the gate COF sub-assembly to the scan lines for displaying an image.

Optionally, the signal line L1, the output line L2, and the grounding line L3 are all metal lines.

Specifically, the liquid crystal display device further comprises a system main board. The system main board is electrically connected to the PCB 2. The system main board is electrically connected to the PCB 2 by a connector arranged on the PCB 2. The system main board functions to generate control signals, such as the data signals and the scan signals, for displaying an image.

Particularly, compared to the prior art where a circular or square test point is used in combination with a transient voltage suppressor to conduct electrostatic test and for protection against static electricity, the present invention provides a liquid crystal display device that does not need to add new components, such as transient voltage suppressor, so as to effectively reduce the component cost while not affecting the transmission of signals and helping improve stability of a display panel.

In summary, the present invention provides a liquid crystal display device, in which a test point is constructed as a triangular structure with a grounding line arranged opposite to and facing an apex of the triangular structure, such that when static electricity is applied to the test point, the static electricity is discharged, through tip discharging, from the apex of the test point to the grounding line to be released through the grounding line to the ground, whereby the capability of the liquid crystal display device resisting damage caused by static electricity is enhanced and compared to the prior art, no additional component is needed and the transmission of signals is not affected, thereby helping reduce cost and improve stability of the liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A liquid crystal display device, comprising: a display panel, a printed circuit board (PCB), a chip-on-film (COF)

assembly connected between the display panel and the PCB, a drive integrated circuit (IC) packaged in the COF assembly, a signal line arranged in the display panel, an output line connected between the signal line and the drive IC, a test point arranged on the output line, and a grounding line arranged adjacent to and spaced from the output line;
   wherein the test point has a shape of a triangle and the test point has an apex projecting beyond one side of the output line that is adjacent to the grounding line and facing the grounding line and not in contact engagement with the grounding line such that a tip discharging effect is induced between the apex of the test point and the grounding line for releasing static electricity from the test point to the grounding line; and
   wherein the COF assembly and the PCB are arranged externally of the display panel such that the triangle of the test point is located outside the display panel to discharge static electricity from the test point to the grounding line outside the display panel.

2. The liquid crystal display device as claimed in claim 1, wherein the grounding line is electrically connected to a ground terminal of the PCB.

3. The liquid crystal display device as claimed in claim 1, wherein the signal line comprises a plurality of mutually parallel and spaced vertical data lines and a plurality of mutually parallel and spaced horizontal scan lines arranged in the display panel.

4. The liquid crystal display device as claimed in claim 3, wherein the COF assembly comprises a source COF sub-assembly for transmission of data signals and a gate COF sub-assembly for transmission of scan signals.

5. The liquid crystal display device as claimed in claim 4, wherein the data lines are electrically connected to output lines associated with the source COF sub-assembly and the scan lines are electrically connected to output lines associated with the gate COF sub-assembly.

6. The liquid crystal display device as claimed in claim 1, wherein the signal line, the output line, and the grounding line are metal lines.

7. The liquid crystal display device as claimed in claim 1 further comprising a system main board, wherein the system main board is electrically connected to the PCB.

8. The liquid crystal display device as claimed in claim 7, wherein the system main board is connected to the PCB by a connector arranged on the PCB.

9. The liquid crystal display device as claimed in claim 1, wherein the test point comprises an isosceles triangle, the test point having a bottom that is collinear and coincident with the output line such that the apex is made facing the grounding line.

10. A liquid crystal display device, comprising: a display panel, a printed circuit board (PCB), a chip-on-film (COF) assembly connected between the display panel and the PCB, a drive integrated circuit (IC) packaged in the COF assembly, a signal line arranged in the display panel, an output line connected between the signal line and the drive IC, a test point arranged on the output line, and a grounding line arranged adjacent to and spaced from the output line;
   wherein the test point has a shape of a triangle and the test point has an apex projecting beyond one side of the output line that is adjacent to the grounding line and facing the grounding line and not in contact engagement with the grounding line to induce a tip discharging effect for releasing static electricity from the test point to the grounding line;
   wherein the grounding line is electrically connected to a ground terminal of the PCB;
   wherein the signal line comprises a plurality of mutually parallel and spaced vertical data lines and a plurality of mutually parallel and spaced horizontal scan lines arranged in the display panel;
   wherein the COF assembly comprises a source COF sub-assembly for transmission of data signals and a gate COF sub-assembly for transmission of scan signals;
   wherein the data lines are electrically connected to output lines associated with the source COF sub-assembly and the scan lines are electrically connected to output lines associated with the gate COF sub-assembly; and
   wherein the COF assembly and the PCB are arranged externally of the display panel such that the triangle of the test point is located outside the display panel to discharge static electricity from the test point to the grounding line outside the display panel.

11. The liquid crystal display device as claimed in claim 10, wherein the signal line, the output line, and the grounding line are metal lines.

12. The liquid crystal display device as claimed in claim 10 further comprising a system main board, wherein the system main board is electrically connected to the PCB.

13. The liquid crystal display device as claimed in claim 12, wherein the system main board is connected to the PCB by a connector arranged on the PCB.

14. The liquid crystal display device as claimed in claim 10, wherein the test point comprises an isosceles triangle, the test point having a bottom that is collinear and coincident with the output line such that the apex is made facing the grounding line.

* * * * *